UNITED STATES PATENT OFFICE 2,664,326

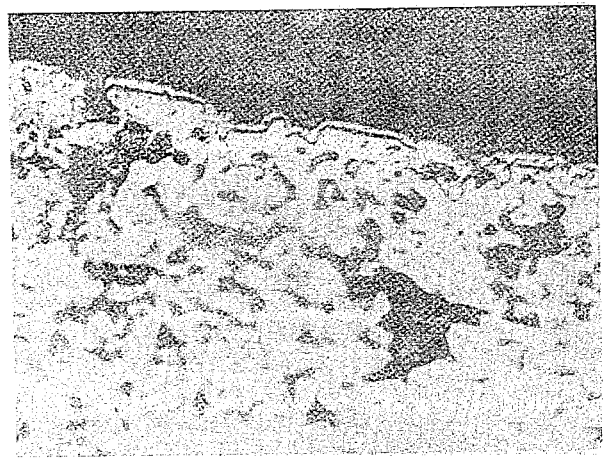

PLATED BEARING AND THE MANUFACTURE THEREOF

Jerome F. Kuzmick, Upper Montclair, N. J., assignor to Ekstrand & Tholand Inc., New York, N. Y., a corporation of New York Application February 11, 1947, Serial No. 727,772

6 Claims. (Cl. 308—237)

The present invention relates to plated bearings and has particular reference to porous self lubricating bearings made from powder metal.

Porous powder metal bearings have heretofore been employed, these bearings usually falling within two general classifications, being either of ferrous metal powder or of a cuprous metal alloy, usually bronze.

One of the factors to be guarded against in connection with bearings is their resistance to corrosion from atmospheric moisture and other corrosion producing conditions. Bearings made of the cuprous alloys are relatively resistant to such corrosion but their strength is such that they are limited to relatively very light unit bearing loads. On the other hand ferrous metal bearings are capable of sustaining relatively high unit bearing loads but are more subject to corrosion and also have the further disadvantage of being usually hard so that if through accident or otherwise the bearing runs dry, not only will the bearing fail but in most instances the failure will be accompanied by scoring of the journal. The latter is particularly to be avoided if possible since while the bearing may be replaced with comparative ease in most cases a scored journal may require replacement of an entire shaft or other expensive part.

The general object of the present invention is the production by new and improved procedure of improved bearings having porous bodies of powder metal, particularly ferrous powder metal, and which are provided with bearing surfaces of appropriate bearing metal bonded to the porous body and also being of porous nature so that the bearing can be impregnated with lubricant to provide a self lubricating bearing structure. Other and more detailed objects of the invention and the manner in which the invention may be carried into effect and its advantages be availed of, will appear more fully in conjunction with the ensuing portion of this specification, descriptive of preferred embodiments of the invention.

In accordance with the broad aspects of the invention a bearing of desired general configuration is first formed of metal powder of the desired base material by the usual powder metallurgy procedure involving the application of pressure to powder in a suitable die. This results in the formation of a so called green blank or compact which is in the nature of a briquette capable of retaining its molded form but having comparatively little mechanical strength. In accordance with usual powder metallurgy procedure a green compact of this kind is then converted to an article having the desired mechanical strength by heat treating it for a predetermined time at a high temperature below the melting temperature of the metal to sinter the material. Thereafter in accordance with usual prior practice, articles of such nature have been plated by electrolytic and other processes in cases where a surface coat or plate of metal other than that of the base metal has been desired. It has been found, however, that if such procedure is followed, the plated article is subject to relatively rapid corrosion due to residual salts from the plating operation remaining in the porous structure, which salts produce a corrosive effect. In accordance with the present invention the prior procedure is varied to include a heat treating or sintering operation subsequent to the plating operation, the sintering operation acting to decompose or volatilize and drive off the residual salts remaining after the plating operation so that corrosion arising from the presence of such salts is eliminated. In many instances it is possible to subject a green compact to the plating operation without intermediate steps and in the interests of simplicity and economy this procedure is desirable when it can satisfactorily be carried out. In other instances the mechanical strength of the green compact may be so low that it cannot be handled without danger of fracture during the usual plating operations, and in such cases the compact may be subjected to a presintering operation of varying degree to increase its mechanical strength. In all cases, however, the plated compact whether having been subjected to a presintering operation or not is subjected to heat treatment following the plating operation.

One highly advantageous form of bearing is one in which the metal of the bearing surface is silver and by way of example but without limitation the following examples are given of procedures followed in the successful production of ferrous porous metal bearings having silver bearing surfaces and embodying the principles of the present invention.

Example I

A mixture of 98% iron powder, 1% graphite and 1% calcium stearate was molded by usual powder metallurgy methods to form a porous bearing body or shell, utilizing a molding pressure of approximately 20 tons per square inch. This pressure resulted in bodies having a porosity of the order of 25–30%. The article so formed was subjected to a presintering operation of 30 minutes duration at 2000° F. The presintered body was then silver plated in accordance with standard practice employing an electrolyte consisting of a solution of silver cyanide having a concentration of 36 grams per liter, sodium cyanide having a concentration of 26 grams per liter and sodium carbonate having a concentration of 29 grams per liter. Plating was carried out using a silver anode, a cathode current density of 2.5–3.0 amperes per square foot and a plating time of approximately 30 minutes. This resulted in the deposition of a silver coating approximately .001 inch in thickness. The plated article was first thoroughly washed with water and then treated with a 5% solution of oxalic acid for a short time, approximately 10 minutes. Following this treatment the article was then sintered in a hydrogen atmosphere for approximately 30 minutes at a temperature of 1500° F.

Example II

A mixture of 73% iron powder, 25% copper powder, 1% graphite and 1% calcium stearate was compressed, plated and sintered after plating in the same manner at stated above in Example I. The only difference in the procedure in this instance is that the presintering step was omitted.

Example III

A mixture of 69% iron powder, 27% copper powder, 3% tin powder and 1% stearic acid was formed and treated in the same manner as the material used in Example II.

It will be noted that in Example I a small amount of graphite was added to the mixture which in some instances is desirable for the purpose of increasing the strength of the material after it has been subjected to sintering and which may in addition provide some secondary lubricating value. The addition of graphite is, however, not essential. Further it will be noted that in Example I the green compact is presintered at a higher temperature than that at which the plated compact is subsequently sintered. The reason for this is that the substantially entirely ferrous material of the green compact requires a higher sintering temperature to develop the desired ultimate strength than can be employed with the plated material because of the relatively lower melting temperature of the silver. Consequently in this case the presintering is provided primarily to develop the desired strength of the bearing body while the final sintering is provided for the purpose of eliminating the residual salts from the porous structure so as to prevent subsequent corrosion due to the presence of such salts.

It will further be noted that in all of the above examples a small amount of an organic compound was added to the mixture of base material to be compressed. For the purpose of making porous bearings, it is desirable to add to the base material a relatively small amount of organic or other compounds which will volatilize at or below the sintering temperatures used. The inclusion of such material which is subsequently removed by volatilization acts to enhance the extent of intercommunication between the pores of the metal and to in effect form minute channels insuring relative freedom of flow of subsequently added lubricant through the porous metal. The addition of such a constituent to the base material does not materially affect the degree of porosity of the material and is not added for that purpose. Rather, it is added in order to change the character of the porosity and to reduce the number of isolated pores or cells formed in the material.

In cases where the porous metal body is plated with silver or other metal by the aid of an electrolytic bath comprising cyanide salts, removal of the residual salts by heat treatment alone is a relatively slow procedure, and in order to more quickly and economically produce corrosion free bearings previously subjected to and containing such salts, it is usually preferable to subject the plated article to treatment of a solution of a neutralizing acid, such as oxalic acid as noted above or a weak solution of sulfuric acid, to convert the cyanide salt to a salt more readily and rapidly removable by heat, such as sodium oxalate or sodium sulfate. In cases where it is desirable to plate the compact with metals not requiring electrolytes containing cyanide salts, as for example in the case of chrome plating employing a bath of which chromic acid is a constituent, the step involving the conversion of the residual salts remaining after the plating operation may be omitted since the originally formed residual salts are readily driven off during the subsequent sintering operation.

Articles made in accordance with the procedures discussed above were finally placed in hot oil, and it was found that within a few moments they had absorbed sufficient oil to fill the pores of the structure. The oil treated articles were then subjected to customary tests for oil absorption such as heating to observe oil exudation and the forcing of oil through the pores by the use of an aspirator pump.

These tests showed that the articles had continuous porosity and that the plated coating did not interfere with this function. It has been found that articles when plated as above described acquire a porous coating, as will be observed from the accompanying drawing comprising a photomicrograph of a polished sample consisting of base material of the mixture given in Example I above and silver plated as above described. The enlargement in the illustration is approximately 400 diameters. In the illustration it will be observed that an irregular and substantially continuous line appears close to the surface of the body. This line indicates approximately the depth of the silver surface plating but does not represent a line of separation between the plating and the body of base material. Its presence is due to the fact that the material is softer than the ferrous metal body and in polishing the sample the silver becomes worn away to a microscopically greater depth than the harder material, thus leaving an observable shadow line at the place where the materials are bonded together.

Rather than there being a line of separation between the two materials, it has been found that the sintering operation carried out subsequent to plating acts to more intimately bond the materials together than would be the case if the plating operation alone were relied upon, and it has been found that a very strong bond is obtained. This has been demonstrated by the fact that articles plated in accordance with the present disclosure may be sized to desired close dimensions by high pressure coining operations without causing separation or other deterioration of the plated surface metal.

Bearings of silver plated ferrous metal prepared as above described, both unimpregnated and impregnated with oil were subjected to a salt atmosphere without showing signs of corrosion whereas similar articles of like base material either unplated or plated in the customary manner without subsequent heat treatment showed considerable corrosion in such atmosphere within 24 hours.

Further, a silver plated ferrous bearing prepared as above described but without oil impregnation was run dry against a mild steel shaft journal and while the bearing scored and ultimately failed due to lack of lubrication, the shaft, even though of relatively soft steel, was not scored when the bearing failed. A similar test with an oil impregnated bearing gave very satisfactory and cool running bearing performance.

From the foregoing it will be evident that in accordance with this invention a highly satisfactory self lubricating bearing is produced, which has the advantages of the strength requisite to sustain unit bearing loads of substantial value while at the same time having a bearing surface of relatively very soft metal of superior bearing quality. At the same time the cost of the bearing is relatively low since the porous plated surface of silver requisite to provide a satisfactory bearing requires the deposition of only a very small quantity of this relatively expensive metal.

The invention is not limited to silver plated ferrous bearings, nor is it limited to the plating of a porous body with a single metal. The feature of subjecting the plated article to a subsequent heat treatment at high temperature, which is characteristic of the invention, provides a further advantage in enabling bearings to be made with plated surfaces consisting of an alloy of different metals. I have found that if a porous metal body is plated successively with two different metals capable of alloying with each other and is then subsequently sintered, the resultant product will have a plated surface consisting of an alloy of the metals employed. Consequently within the scope of this invention porous metal bodies may be plated successively in accordance with well known plating methods with two or more layers of suitable metals of the class recognized as forming satisfactory bearing alloys. Such combinations may for example be alloys of silver-indium, aluminum-tin and nickel-tin. In instances where resistance to corrosion is a primary factor where a ferrous metal bearing is desired because of its strength, a plating of nickel may be employed. This will provide, with a cheaper metal, a satisfactory bearing which is corrosion resistant. Still other alloys will occur to those skilled in the art.

While the invention is particularly useful in the production of ferrous base bearings, because of the relative strength of such material, it is not limited to such base material and if desired silver or other plating in accordance with the principles of the invention may be applied to a bearing base material such as bronze.

While in most instances it will be found most desirable to plate by electro-plating methods, the invention is not limited to this specific mode of deposition of the plating material. Known methods of chemical displacement may be employed, but regardless of the specific mode of deposition, heat treatment to remove residual salts from the porous body should follow the plating operation or operations.

It will be evident to those skilled in the art from the foregoing description that the invention is applicable to a wide variety of materials and combinations of materials and that the specific mode of procedure is also subject to variation depending upon the materials employed and the required specifications to be met by the end product. The invention is accordingly to be understood as embracing all novel features of method and product falling within the scope of the appended claims.

What is claimed is:

1. The method of making a porous plated bearing comprising forming a bearing body of powdered ferrous metal by molding the powder into the shape of a bearing under sufficient pressure to produce a green compact mass capable of retaining its form and which includes interconnected pores, electroplating the bearing surface of said body with a bearing metal forming a porous metallic coating, subjecting the electroplated bearing body to a heat treatment of sufficient intensity and sufficient duration to remove any salts retained in the body, and heating the bearing body sufficiently to sinter the powdered bearing body mass to provide mechanical strength for retaining the bearing in operating condition while retaining the porous structure.

2. The method of making a porous plated bearing comprising forming a bearing body of powdered ferrous metal by molding the powder into the shape of a bearing under sufficient pressure to produce a green cmpact mass capable of retaining its form and which includes interconnected pores, electroplating the bearing surface of said body with a silver bearing metal forming a porous metallic coating, subjecting the electroplated bearing body to a heat treatment of sufficient intensity and sufficient duration to remove any salts retained in the body, and heating the bearing body sufficiently to sinter the powdered bearing body mass to provide mechanical strength for retaining the bearing in operating condition while retaining the porous structure.

3. The method of making a porous plated bearing comprising forming a bearing body of powdered ferrous metal by molding the powder into the shape of a bearing under sufficient pressure to produce a green compact mass capable of retaining its form and which includes interconnected pores, electroplating the bearing surface of said body with a bearing metal forming a porous metallic coating, subjecting said bearing body to heat treatment sufficient to sinter the same and to retain the shape of the bearing and its porous structure during use, such heat treatment also including subjecting the electroplated bearing body to a heat treatment of sufficient intensity and sufficient duration to remove any salts retained in the body.

4. A bearing made according to the process of claim 1 wherein the plated bearing comprises a body of porous ferrous metal with an electroplated bearing surface wherein the plated bearing is free of salts.

5. A bearing made according to the process of claim 2 wherein the plated bearing comprises a body of porous ferrous metal with an electroplated bearing surface wherein the plated bearing is free of salts.

6. A bearing made according to the process of claim 3 wherein the plated bearing comprises a body of porous ferrous metal with an electroplated bearing surface wherein the plated bearing is free of salts.

JEROME F. KUZMICK.

References Cited in the file of this patent

UNITED STATES PATENTS

| Number | Name | Date |
|---|---|---|
| 1,753,581 | Seabury | Apr. 8, 1930 |
| 1,907,710 | Bass | May 9, 1933 |
| 2,116,927 | Germer | May 10, 1938 |
| 2,364,713 | Hensel | Dec. 12, 1944 |
| 2,379,435 | Hensel | July 3, 1945 |
| 2,386,951 | Howe | Oct. 16, 1945 |
| 2,409,295 | Marvin et al. | Oct. 15, 1946 |
| 2,431,947 | Martz | Dec. 2, 1947 |
| 2,478,037 | Brennan | Aug. 2, 1949 |
| 2,491,839 | Tinker | Dec. 20, 1949 |

OTHER REFERENCES

Principles of Powder Metallurgy by W. D. Jones, published by Edward Arnold & Co., London, 1937, pages 151, 152, 153, 154.